United States Patent [19]

Royalty

[11] Patent Number: 5,207,758
[45] Date of Patent: May 4, 1993

[54] METHOD OF MANUFACTURING A WREATH

[76] Inventor: Galen E. Royalty, 1222 Cresthaven Dr., Silver Spring, Md. 20903

[21] Appl. No.: 655,030

[22] Filed: Feb. 14, 1991

[51] Int. Cl.⁵ .............................................. A01G 5/00
[52] U.S. Cl. ..................................... 47/41.13; 47/58; 428/10; 428/27
[58] Field of Search ................ 47/41.12, 41.13, 41.01; 428/22, 10, 24, 25, 26, 27

[56] References Cited

U.S. PATENT DOCUMENTS

| | | |
|---|---|---|
| 490,642 | 1/1893 | Diemer . |
| 2,258,442 | 10/1949 | Brenner . |
| 2,740,218 | 3/1956 | Miller . |
| 2,929,171 | 3/1960 | Josephson ............................ 47/41.13 |
| 3,308,005 | 3/1967 | Pinnecker ............................ 47/41.01 |

FOREIGN PATENT DOCUMENTS

| | | | |
|---|---|---|---|
| 526130 | 6/1931 | Fed. Rep. of Germany ..... 47/41.13 |
| 373432 | 5/1907 | France .................................. 428/24 |
| 23373 | 4/1901 | Switzerland ....................... 41/41.12 |

*Primary Examiner*—Henry E. Raduazo
*Attorney, Agent, or Firm*—John B. Dickman, III

[57] ABSTRACT

A method of manufacturing a wreath without using fasteners consisting of forming a helical coil circle or ring and inserting sprigs of evergreen between the coils thus interlocking the sprigs in the coils

4 Claims, 1 Drawing Sheet

METHOD OF MANUFACTURING A WREATH

BACKGROUND OF THE INVENTION

The invention relates to a method of manufacturing a wreath, and in particular to a method of manufacturing a wreath without the use of ties or other fasteners.

Prior methods for constructing a wreath include the use of a ring with sprigs of evergreen fastened to it. Wire is wrapped around the sprig shafts and the ring to lock them together. Another method includes long branches of evergreen woven into a circle to create a wreath. A more modern method uses a styrofoam ring into which the sprigs are inserted.

These methods have shortcomings which are overcome by the present invention, as using wire ties to fasten the sprigs to the ring is very time consuming, and weaving sprigs together or sticking sprigs into a styrofoam ring allows the sprigs to unravel or fall off the wreath. With these shortcomings in mind the present invention secures the sprigs to a helical coil circle or ring without the use of fasteners.

There are U.S. patents which show rings for supporting sprigs of evergreen without the use of wire ties or interweaving the sprigs together. The following is a list of patents known to the inventor:

U.S. Pat. No. 1,433,808—issued to Fox
U.S. Pat. No. 1,631,631—issued to Gerlinger
U.S. Pat. No. 2,740,218—issued to Miller
U.S. Pat. No. 3,239,170—issued to Binyon Of these patents, the Miller patent is of the most interest. The patent shows a flat ring with a plurality of triangular staples that clip on the ring to secure the evergreen on the ring.

SUMMARY OF THE INVENTION

The present invention relates to a holiday wreath and a method of manufacture, and in particular a wreath constructed of a helical wire frame and a method of manufacturing a wreath.

The primary object of the invention is to provide a method of constructing a holiday wreath using a wire frame to hold the evergreen sprigs in place.

Another object of the invention is to provide a method of constructing a wire frame and interlocking evergreen sprigs to the frame.

A further object of the invention is to provide a method of constructing a holiday wreath which is simple and easy.

The method of constructing a holiday wreath consists of forming a helical coil wire frame by wrapping a framing wire on a spindle to form a helix, removing the helical coil from the spindle and stretching the coils to form a circle by attaching the free ends. Stretching the coils leaves each coil spaced from the next coil. Spacing the coils one-half the diameter of the coils provides space for pushing an evergreen sprig through two or more coils, interlocking the sprig in the coils.

If the sprigs are small, plural sprigs are bunched together and pushed through the coils. Sprigs are added by moving in one direction and going to the next coil, which already has branches inserted in it, and pushing sprigs through two coils. Therefore, the progression formula for adding sprigs is $n+(n+1)(n+2)\ldots(n+x)$ until all of the coils support sprigs, where n is the first coil and x is the last coil.

The size of the wreath being constructed dictates the gauge of the wire frame, the number of coils and the size of the coils. Larger wreaths require heavier gauge wire, as long as the wire can be wound on a spindle the heavier gauges provide better support for a larger wreath. By larger wreaths, reference is made to diameters greater than fifteen inches.

Smaller wreaths can be constructed from lighter gauge wire, the real critical requirement is a helical coil frame that will retain its circular shape when supporting sprigs of evergreens.

DESCRIPTION OF THE INVENTION

Figure 1:
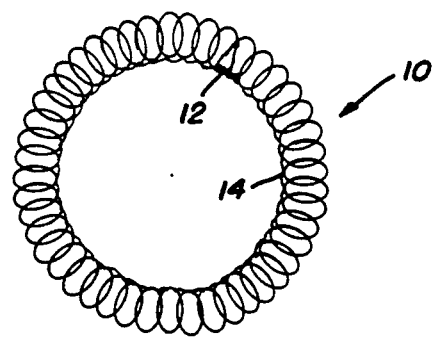
FIG. 1 is a front plan view of a wire support of the present invention.

Referring to the drawings, there is shown in FIGS. 1–7 a holiday wreath used as a decoration inside or outside of a house or building at Christmas time and during the winter season. Wreaths are mostly considered as Christmas ornaments, however, more and more wreaths are being used as winter decorations. When used as a Christmas wreath, evergreens ornament the wreath, but winter wreaths use dried flowers, plants, leaves and cones, and fruits and nuts.

Figure 3:
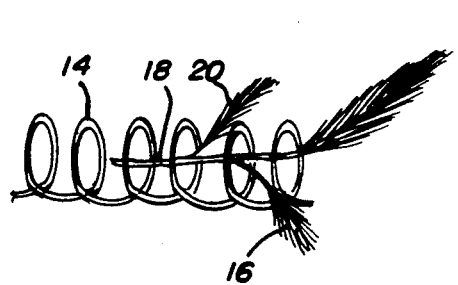
FIG. 3 is a partial view of a wire support with plural evergreen sprigs inserted.
Figure 2:
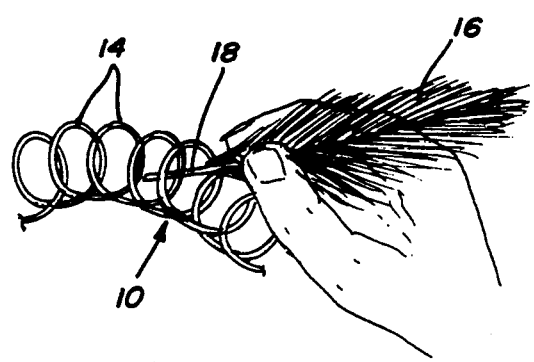
FIG. 2 is a partial view of a wire support with an evergreen sprig being inserted.

To support the foliage, whether it is evergreen or dried foliage and fruits and nuts, a metal frame is most often used. FIG. 1 shows a helical coil frame 10 formed in the shape of a circle. The ends of the helical coils are fastened together at 12. The helical coils, most clearly shown in FIGS. 2 and 3, are separated to provide a space between each coil 14. The width of the space may vary, however, a width of about one inch has been found to be advantageous for larger frames. There is a relationship between the width of the spaces between the coils and the diameter of the coils, which also corresponds to the diameter of the wire frame 10. Using twelve inches as a standard size wire frame, the width of the spaces between the coils 14 is ½ inch and diameter of the coils is one inch. There is also a relationship between the gauge wire used in the helical coil frame and the diameter of the completed frame. Larger frames require heavier gauge wire to provide sufficient stiffness to the frame, whereas smaller frames can use lighter gauge wire. The importance of selecting a wire gauge of sufficient size is to prevent the frame from sagging because of the added weight of the foliage. It is critical that the wire gauge selected will wrap around a spindle, which will be explained later.

Figure 6:
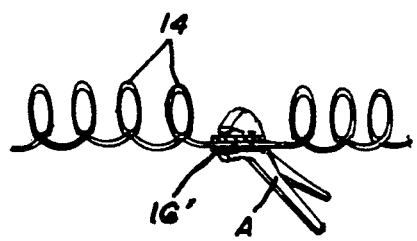
FIG. 6 shows the ends of the helical coil of wire connected at the free ends.

FIG. 1 shows a completed frame 10 formed into a circle and joined at its ends as shown in FIG. 6. The two ends of the helical coil 10 are joined by an aluminum sleeve 16 slipped over both ends and crimped by a pair of pliers A.

In FIG. 2 the helical coil frame 10 has a plurality of coils 14 separated to receive an evergreen sprig 16. The sprig 16 has a branch or shaft 18 long enough to pass through at least two coils 14. When the sprig 16 has passed two coils 14, it is pulled to force one of the sprig side branches 20 to abut against one of said coils, preventing the sprig from being removed, as shown in FIG. 3. In many cases, several sprigs 16 can be inserted at one time to give the wreath a fuller appearance.

Figure 4:
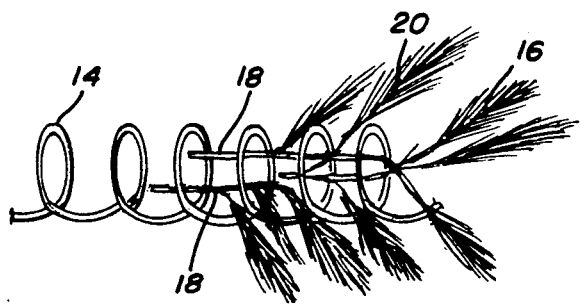
FIG. 4 is a perspective view of a spindle machine for forming a helical coil of wire.

FIG. 4 shows the helical coil frame 10 with a plurality of evergreen sprigs inserted in the coils 14. A completed wreath will have at least one sprig 16 protruding between each pair of coils 14. In most cases, there will be two or more sprigs between the coils. There is a progression for inserting sprigs through the coils. As stated the shaft 18 of each sprig passes through at least two coils 14 with the sprig end protruding from the frame 10. A formula for the progression is $n+(n+1)+(n+2)+(n+3) \ldots (n+x)$ where n represents the first coil and x represents the last coil. Sprigs are inserted through the first coil n and each subsequent coil until all of the coils have been filled.

Figure 5:
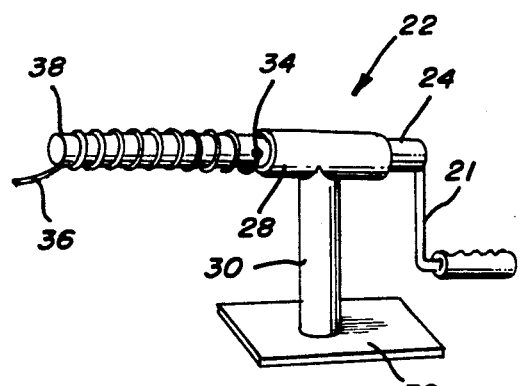
FIG. 5 is a perspective view of a spindle shaft where the helical coil of wire is stretched.
Figure 7:
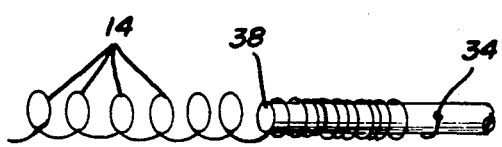

The helical coil 10 is formed using a helical coil machine 22 of FIG. 5. The machine has a spindle 24 with a handle crank 26 for rotating the spindle. The spindle 24 is supported in a stationary sleeve 28, mounted on a vertical support 30 having a fixed platform 32. There is an aperture 34 for receiving the end of a wire 36. With the wire 36 inserted in the aperture 34 the spindle 24 is rotated to wrap the wire around the spindle. When enough coils are formed the coils are separated by pulling the coil closest to the spindle end 38 having away from the next coil on the spindle, FIG. 7. When all of the coils 14 are formed, including those remaining on the spindle, the end of the wire 36 is removed from the aperture 34 and the helical coil is formed into a frame 10.

The method for creating a wreath begins with winding a selected gauge wire into a helical coil and joining the free ends of the coil to form a circle. Starting with a first coil 14 a sprig 16 of evergreen is inserted through the first two coils so that the greenery protrudes from the first coil and at least one side branch 20 protrudes between the first and second coils. The next sprig 16 is inserted through the second coil 14 and interlocked with the frame 10 just like the first sprig. The sprigs are similarly inserted in all of the subsequent coils until the wreath is completed.

While only one embodiment of the invention has been shown, it is understood that one skilled in the art may realize other embodiments. Therefore for a full understanding of the invention one should consider the drawings, description and claims.

What is claimed is:

1. A method of manufacturing a wreath consisting of:
   wrapping a wire around a spindle to form a helical coil having a predetermined diameter, removing said helical coil from said spindle and separating the helical coils to provide spaces between two adjacent coils, and attaching the free ends of the helical coil to create a ring;
   selecting sprigs of evergreen or other ornamental material having a shaft and side branch, inserting the shaft of at least one of said sprigs through a first and second coil of said helical coil such that said side branch protrudes between said first and second coils, and
   repeating the insertion of sprigs into the next coils sequentially around the helical coil ring until sprigs are protruding between all of the coils and sprigs interlock with the coils to prevent removal.

2. A method of manufacturing a wreath as in claim 1 wherein the spaces between coils is equal to one half the diameter of the coil.

3. A method of manufacturing a wreath as in claim 2 wherein the wire forming the helical coil circle is of a gauge to support the weight of the sprigs without distorting the shape of said ring.

4. A method of manufacturing a wreath as in claim 3 wherein the progression for inserting sprigs is $n+(n+1)+(n+2)+(n+3)+\ldots(n+x)$, where n represents the first coil and x represents the last coil.

* * * * *